United States Patent
Cagan et al.

(10) Patent No.: US 9,518,201 B2
(45) Date of Patent: Dec. 13, 2016

(54) ADHESIVE COMPOSITION THAT CAN BE PEELED AFTER CROSSLINKING

(75) Inventors: Virginie Cagan, Moncourt Fromonville (FR); Karen Blachere, Le Mee sur Seine (FR); Patrick Michel Mas, Saint Maur des Fosses (FR); Fabrice Herblot, Melun (FR)

(73) Assignee: Bostik S.A., Courbevoie (FR)

( * ) Notice: Subject to any disclaimer, the term of this patent is extended or adjusted under 35 U.S.C. 154(b) by 1292 days.

(21) Appl. No.: 12/642,197

(22) Filed: Dec. 18, 2009

(65) Prior Publication Data

US 2010/0154991 A1 Jun. 24, 2010

(30) Foreign Application Priority Data

Dec. 18, 2008 (FR) .................................. 08 07125

(51) Int. Cl.
| | |
|---|---|
| C09J 143/04 | (2006.01) |
| C08G 18/48 | (2006.01) |
| C08G 18/71 | (2006.01) |
| C08G 18/75 | (2006.01) |
| C08G 65/336 | (2006.01) |
| C08L 33/06 | (2006.01) |

(Continued)

(52) U.S. Cl.
CPC .......... *C09J 143/04* (2013.01); *C08G 18/4825* (2013.01); *C08G 18/718* (2013.01); *C08G 18/755* (2013.01); *C08G 65/336* (2013.01); *C08L 33/06* (2013.01); *C08L 71/02* (2013.01); *C08L 75/04* (2013.01); *C08L 75/08* (2013.01); *C09J 133/06* (2013.01); *C09J 171/02* (2013.01); *C09J 175/08* (2013.01); *C09J 183/06* (2013.01); *C08G 18/10* (2013.01); *C08G 2650/58* (2013.01); *C08L 43/04* (2013.01); *C08L 83/00* (2013.01); *C08L 83/06* (2013.01); *C09J 175/04* (2013.01)

(58) Field of Classification Search
CPC ..... C08G 18/718; C08G 18/10; C08G 65/336; C08G 2650/58; C09J 175/08; C09J 175/04; C09J 17/02; C09J 143/04; C08L 75/08; C08L 75/04; C08L 71/02; C08L 83/00; C08L 83/06; C08L 43/04
USPC .......................... 156/329; 524/492, 493, 847
See application file for complete search history.

(56) References Cited

U.S. PATENT DOCUMENTS

| | | | |
|---|---|---|---|
| 6,310,170 B1 | 10/2001 | Johnston et al. | |
| 2002/0115811 A1* | 8/2002 | Huang | C08F 290/148 528/24 |

(Continued)

FOREIGN PATENT DOCUMENTS

| | | | |
|---|---|---|---|
| DE | WO 2007131912 A1 * | 11/2007 | ........... C08G 77/458 |
| EP | 2 199 343 | 6/2010 | |

(Continued)

OTHER PUBLICATIONS

Machine Translation of JP 06-299103.*

(Continued)

*Primary Examiner* — Ling Choi
*Assistant Examiner* — David L Miller
(74) *Attorney, Agent, or Firm* — Millen, White, Zelano and Branigan, P.C.

(57) ABSTRACT

The present invention involves an adhesive composition and a method for its-use, especially by consumers, for fastening various articles, for example for the purposes of fitting out or decorating dwellings.

15 Claims, 1 Drawing Sheet

(51) Int. Cl.

| | | |
|---|---|---|
| *C08L 71/02* | (2006.01) | |
| *C08L 75/04* | (2006.01) | |
| *C08L 75/08* | (2006.01) | |
| *C09J 133/06* | (2006.01) | |
| *C09J 171/02* | (2006.01) | |
| *C09J 175/08* | (2006.01) | |
| *C09J 183/06* | (2006.01) | |
| *C08G 18/10* | (2006.01) | |
| *C09J 175/04* | (2006.01) | |
| *C08L 83/00* | (2006.01) | |
| *C08L 43/04* | (2006.01) | |
| *C08L 83/06* | (2006.01) | |

(56) References Cited

U.S. PATENT DOCUMENTS

| | | | |
|---|---|---|---|
| 2003/0225237 A1* | 12/2003 | Roesler et al. | 528/28 |
| 2004/0180155 A1 | 9/2004 | Nguyen-Misra et al. | |
| 2004/0181007 A1 | 9/2004 | Acevedo et al. | |
| 2004/0220308 A1 | 11/2004 | Paul et al. | |
| 2005/0101753 A1 | 5/2005 | Schindler et al. | |
| 2005/0272835 A1* | 12/2005 | Iwakiri et al. | 523/218 |
| 2006/0194930 A1 | 8/2006 | Bachon | |
| 2007/0219311 A1 | 9/2007 | Lucet et al. | |
| 2008/0017296 A1 | 1/2008 | Zhu et al. | |
| 2008/0125541 A1* | 5/2008 | Hattemer et al. | 524/837 |
| 2008/0245476 A1 | 10/2008 | Loth et al. | |
| 2009/0156737 A1* | 6/2009 | Schindler | C08G 77/458 524/588 |

FOREIGN PATENT DOCUMENTS

| | | | | |
|---|---|---|---|---|
| JP | | 06299103 A | * 10/1994 | C09D 7/12 |
| WO | WO 2005/097934 | | 10/2005 | |
| WO | WO 2007/131912 | | 11/2007 | |

OTHER PUBLICATIONS

EVONIK Industries "Dynasylan 6490" [reactive vinyl siloxane oligomer, methyoxy functional] (downloaded from Internet Nov. 6, 2013).

* cited by examiner

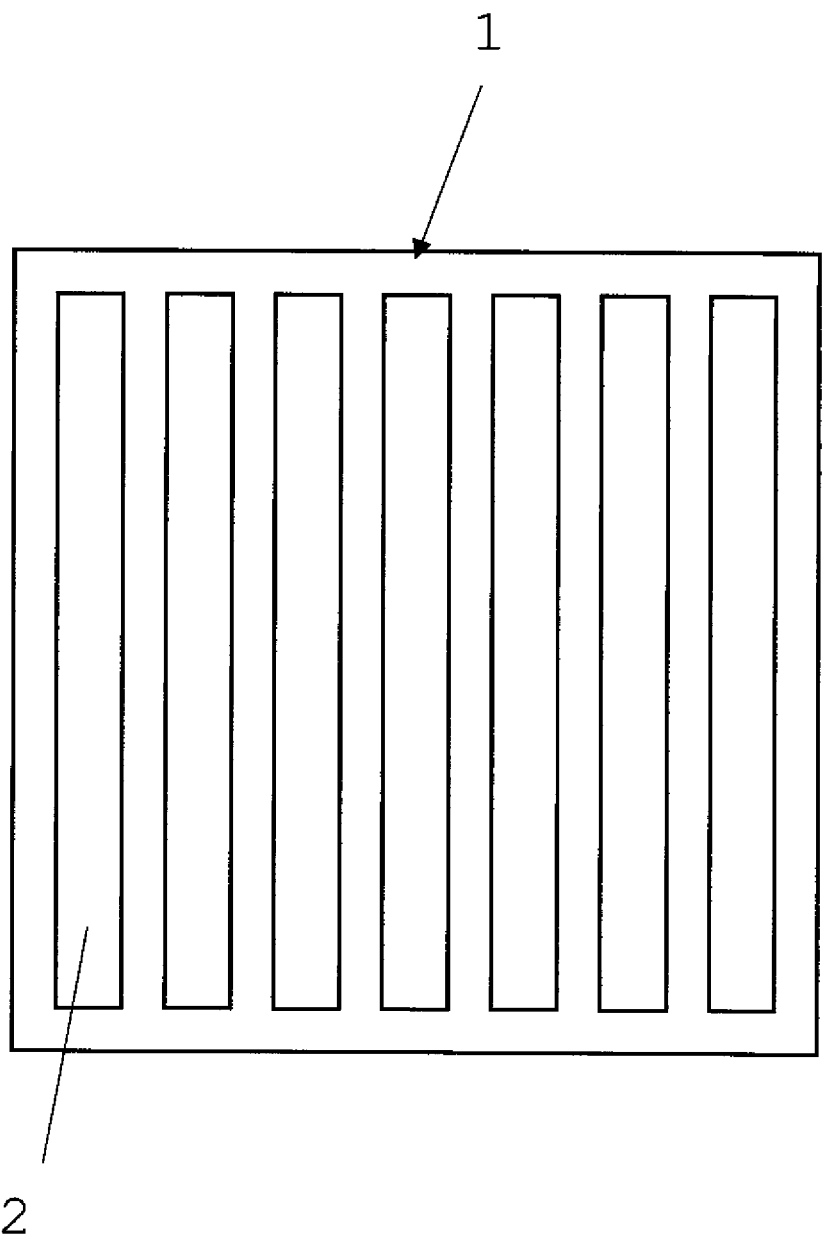

ADHESIVE COMPOSITION THAT CAN BE PEELED AFTER CROSSLINKING

CROSS-REFERENCE TO RELATED APPLICATIONS

This application is the U.S. Utility Application Filing of French Application No. 08.07125, filed Dec. 18, 2008, which claims priority thereof, the disclosure of which is hereby incorporated in its entirety by reference.

FIELD OF THE INVENTION

The present invention involves an adhesive composition and a method for its use, especially by consumers, for fastening various articles, for example for the purposes of fitting out or decorating dwellings.

BACKGROUND OF THE INVENTION

Fixing glues (also known as adhesives or else mastics) are widely used by individuals in their indoor works in order to fasten the most diverse articles to the floors, walls or ceilings and thus avoid the use of conventional mechanical fixing systems based, for example, on nails, screws and/or rawlplugs. The fixing mastics widely available nowadays thus make it possible to fasten, for example to a vertical surface, articles of very large weight that correspond to the application to the bonding joint (or adhesive joint) of shear stresses of around 15 kg/cm$^2$ to 100 kg/cm$^2$. The nature of the substrate to which the article may be fastened is itself very varied; mention may especially be made of plaster or ceramic tiles, concrete, asbestos cement, or else wood.

It is thus possible to envisage the fastening, by bonding, of articles such as, for example, spotlights for lighting, hooks, mirrors, pegs or coat racks of various shapes, curtain rod supports and even supports for shelves intended for storing crockery, kitchen utensils or books.

The solidity of the assembly thus produced results from the excellent cohesion of the adhesive joint of around 0.1 to 2 millimeters in thickness by which the article is fastened to the substrate. The solidity of the assembly is also the result of the quality of the adhesion between the two faces of said joint and, respectively, the article and the substrate.

The solidity of the assembly obtained by the fastening of these articles to the various substrates however raises the question of their separation with the consumer, especially when the latter desires to refit his home, or else in the case of a change of occupant of the dwelling premises. There is thus a serious risk either that the individual would not be able to detach the article fastened to the substrate, or that the separation achieved by force results in the article and/or the substrate in question being damaged.

Patent application US 2006/0178470 describes a composition suitable for use as a fixing adhesive, which comprises less than 15% by weight of a polyurethane containing a silyl group and from 20 to 95% by weight of a filler. This adhesive offers a good separability between the bonded article and the substrate, also referred to as reversible adhesive behaviour; this separation takes place by a cut made in the bulk of the adhesive joint using a suitable cutting tool such as a spatula, a scraper or else a metal wire. This separation is however accompanied by the presence of residues originating from the adhesive joint which are solidly fastened both to the separated article and to the substrate, the removal of which requires difficult work of scraping with a spatula and which may prove practically impossible in the case of rough substrates such as wood, concrete or asbestos cement.

DETAILED DESCRIPTION

The objective of the present invention is to overcome this drawback.

Another objective of the present invention is to propose an adhesive suitable for the fastening of articles against a vertical surface such as a wall, which provides a shear strength of the adhesive joint that corresponds to 3 to 20 kg/cm$^2$.

Another objective of the present invention is to propose an adhesive suitable for the fastening of articles to the ceiling, which provides a tensile strength of the adhesive joint that corresponds to a value of 5 to 30 kg/cm$^2$ when said joint is between two rigid wooden supports.

Another objective of the present invention is to provide an adhesive suitable for the fastening of articles to various substrates such that the adhesive joint attaching the article to the substrate can be easily subjected to a failure which lies essentially at its interface with said article or said substrate, such a failure being referred to as "adhesive failure".

Another objective of the present invention is to propose an adhesive suitable for the fastening of articles to various substrates such that the article, after being fastened, can be separated from the substrate without damaging either the latter or said article.

It has now been found that these objectives can be achieved in their entirety or partly by means of the adhesive composition and of the method that uses it which are described below.

One subject of the present invention is firstly an adhesive composition comprising:
- from 58 to 80% of a moisture-crosslinkable polymer (A) having an alkoxysilane terminal radical;
- from 8 to 20% of a silica (B) having a BET specific surface area between 150 and 250 m$^2$/g;
- from 4 to 15% of an oligomer (C) having a molecular weight between 500 and 5000 Da and that is capable of being obtained by oligomerization of a vinyl derivative of an alkoxyalkylsilane; and
- from 0.01 to 3% of a crosslinking catalyst (D).

The main chain of the polymer (A) may be chosen from the following polymer chains:
- (A1) polyoxyalkylenes (or polyethers) having a molecular weight between 500 and 30 000 Da, preferably between 3000 and 15 000 Da, and especially polyoxyethylenes and polyoxypropylenes;
- (A2) polyurethanes having a molecular weight between 600 Da and 60 kDa, preferably between 1000 and 30 000 Da, obtained by condensation of a polyol (especially of polyether and/or polyester type) with polyisocyanates;
- (A3) homopolymers and copolymers having a molecular weight between 5 and 100 kDa, obtained from:
  - at least one monomer of alkyl (meth)acrylate type comprising an alkyl radical having a number of carbon atoms between 1 and 15, preferably between 1 and 10; and optionally
  - other monomers, such as styrene derivatives, vinyl ethers, (meth)acrylic acids or other polyunsaturated derivatives, these other monomers possibly being used up to contents of 50% by weight relative to all of the monomers. These other monomers are, for example, such as those described in U.S. Pat. No. 4,593,068.

The adhesive composition according to the invention is particularly suitable for use as a fixing adhesive. Furthermore, after its application in order to fasten an article to a substrate, said article may be easily separated from said substrate by means of an adhesive failure. The corresponding behaviour of the adhesive joint attaching the article and the substrate is also known as "peelable" behaviour. The peelability of the adhesive joint obtained by the use, as a fastening adhesive, of the adhesive composition according to the invention advantageously makes it possible to separate the article fastened to the substrate without leaving residues attached to the surface of the article and/or of the substrate.

The alkoxysilane terminal radical has the formula (I):

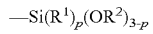

in which:
R$^1$ and R$^2$, which are identical or different, each represent a linear or branched alkyl radical having 1 to 4 carbon atoms, with the possibility, when there are several R$^1$ (or R$^2$) radicals, that these are identical or different;
p is an integer equal to 0, 1 or 2.

The alkoxysilane radical may be connected to the main chain of the polymer (A) directly by its available bond or indirectly, especially via a divalent hydrocarbon-based radical, preferably by an alkylene radical such as for example the radical of formula: —CH$_2$—CH$_2$—CH$_2$—.

Preferably, the alkoxysilane radical is chosen from radicals of the following formula:

—Si(OCH$_3$)$_3$,—Si(CH$_3$)(OCH$_3$)$_2$,—Si(OCH$_2$CH$_3$)$_3$,
—Si(CH$_3$)(OCH$_2$CH$_3$)$_2$.

The polymers (A) are prepared according to processes that are known per se and are, for example, explained by the aforementioned application US 2006/0178470. The polymers having the main chain (A3) may be prepared according to processes described in patent applications EP 1657155 and EP 1371670. Several of these polymers (A) are widely commercially available.

Thus, the polyethers having an alkoxysilane terminal radical are available from Kaneka, as for example the product S303H.

Among the polymers A, the main chain of which is a polyurethane, mention may especially be made of a polyurethane comprising 2 terminal groups of alkoxysilane type and having the formula (II), which, for clarity of the presentation, is cut from left to right into the three following groups, connected to one another by a single bond:

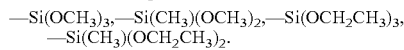

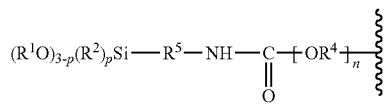

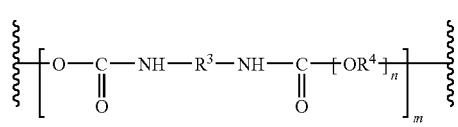

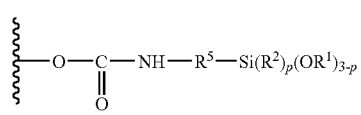

in which:
R$^1$ and R$^2$ are as defined previously;
R$^3$ represents a hydrocarbon-based divalent radical comprising from 5 to 15 carbon atoms which may be aromatic or aliphatic, linear, branched or cyclic;
R$^4$ represents a linear or branched alkylene divalent radical comprising from 1 to 4 carbon atoms;
R$^5$ represents a linear alkylene divalent radical comprising from 1 to 3 carbon atoms;
n is an integer such that the molecular weight of the polyether block of formula —[OR$^4$]$_n$— is between 300 Da and 30 kDa;
m is an integer such that the molecular weight of the polymer of formula (II) is between 600 Da and 60 kDa; and
p is as defined previously.

In the present text and unless otherwise indicated:
the amounts expressed in the form of percentages correspond to weight/weight percentages;
the R$^1$ to R$^5$ radicals and also the integers n, m and p retain, in the various chemical formulas, the same meaning as that defined above;
the molecular weights that are indicated for the polymers, blocks of polymers or oligomers are number-average molecular weights, expressed in daltons (Da). They are determined by gel permeation chromatography, the column being calibrated with polyethylene glycol (PEG) standards.

The polymer of formula (II) may be obtained according to the following process.

In a first step, a polyurethane is prepared comprising 2 terminal hydroxyl groups and having the formula (III):

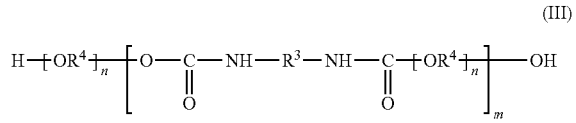

by reacting one mole of diisocyanate of formula (IV):

with around two moles of a polyether diol of formula (V):

which corresponds to a ratio of the numbers of NCO/OH functional groups equal to around 0.5.

The reaction is carried out at a temperature between 60 and 90° C., for a time of around 2 to 8 hours, and optionally in the presence of a catalyst.

The polyurethane of formula (III) is, in a second step, converted to polyurethane of formula (II), by a silylation reaction with an isocyanatosilane of formula (VI):

in a ratio of around one mole of polyurethane of formula (III) per two moles of the compound of formula (VI).

The polyether diols of formula (V) are widely commercially available, and the isocyanatosilanes of formula (VI) are too. Mention may be made, by way of example, of γ-isocyanato-n-propyltrimethoxysilane which is available under the name Geniosil® GF 40 or else α-isocyanato-n-methylmethyldimethoxysilane which is available under the trade name Geniosil® XL 42, both from Wacker.

These two synthesis steps are carried out under anhydrous conditions, so as to avoid the hydrolysis of the alkoxysilane groups. A typical temperature range for the implementation of these reactions is from 30 to 120° C., and more particularly from 60 to 90° C. A slight variation with respect to the stoichiometries given previously may be envisaged without a drawback, on condition however of not exceeding 10% in the first step (synthesis of the polyurethane of formula III) and 2% in the second step (synthesis of the polyurethane of formula II).

Reference is made to European Patent EP 0 931 800 for further details concerning the preparation of the polyurethane A of formula (II) having terminal groups of alkoxysilane type.

The silica (B) used in the adhesive composition according to the invention is generally obtained by pyrogenation and is widely commercially available. Use is made, for example, of a pyrogenic silica which is sold by Wacker with a specific surface area between 150 and 200 $m^2/g$.

The oligomer (C) used in the adhesive composition according to the invention is prepared according to known processes and is widely commercially available. Mention may especially be made of DYNASYLAN® 6490 which is a vinyltrimethoxysilane oligomer sold by Degussa, having a molecular weight of around 900 Da.

The crosslinking catalyst (D) that can be used in the composition according to the invention may be any catalyst known to a person skilled in the art for the condensation of silanol. Mention may be made, as examples of such catalysts, of organometallic compounds based on iron or divalent or tetravalent tin. Such compounds are commercially available, for example from Evonik such as TEGOKAT® 223 which is a catalyst based on dioctyl tin.

According to one variant of the adhesive composition according to the invention, it comprises from 60 to 77% of polymer (A), from 10 to 18% of pyrogenic silica (B), from 5 to 12% of oligomer (C) and from 0.1 to 2% of catalyst (D).

The adhesive composition according to the invention may comprise, in addition, various additives such as UV stabilizers, adhesion promoters, thickeners and desiccants, and various mineral fillers such as calcium carbonate.

According to one preferred variant, the composition according to the invention comprises up to 3% of a hydrolysable alkoxysilane derivative, as a desiccant, and preferably a trimethoxysilane derivative. Such a desiccant advantageously prolongs the shelf life of the composition according to the invention during storage and transport, before the use thereof. Mention may be made, for example, of the vinyltrimethoxysilane available under the trade name DYNASYLAN® VTMO from Degussa.

According to one more particularly preferred variant of the composition according to the invention, it comprises, in addition, from 0.1 to 5% of rubber granulates of non-spherical shape having a size between 0.5 and 2 mm, preferably between 0.8 and 1.2 mm. These granulates are advantageously produced by grinding recycled tyres and are commercially available.

The adhesive composition according to the invention may be prepared by simple mixing at ambient temperature of its ingredients.

The invention also relates to a method for fastening an article to a substrate included in the floors, vertical surfaces and/or ceilings of dwellings, comprising:
i) the deposition of the adhesive composition as defined previously in the form of a bead having a diameter of 2 to 10 mm, preferably from 4 to 10 mm, onto the surfaces of the article or of the substrate intended to be in contact;
ii) the application, by simple manual pressure, of the article to the substrate; then
iii) the crosslinking of said adhesive composition under the effect of atmospheric moisture over a time between 1 hour and 48 hours, preferably between 4 hours and 24 hours.

With a view to its use in this method, the adhesive composition is generally packaged in the absence of air in a sealed container (or cartridge) equipped with a cannula (or nozzle), in which it is conveyed to the end user. At the moment of its use, for example by the consumer, the cartridge is placed in a gun which makes it possible to extrude the adhesive composition through the nozzle, in the form of a bead, the diameter of which is defined by the diameter of the nozzle, generally between 2 and 10 mm.

The use of this method is preferred for the fastening of articles to a substrate included in a vertical surface, such as for example a wall or a partition wall.

It is also preferred to deposit the bead of adhesive composition onto the planar surface of the article intended to be brought into contact with the substrate.

The method according to the invention advantageously enables the fastening of articles, the weight of which corresponds to a shear stress exerted on the joint constituted of the crosslinked adhesive composition, ranging from 3 to 20 $kg/cm^2$.

Among the articles which may be fastened by the method according to the invention, mention may be made of articles that can be used for the purposes of fitting out or decorating dwellings, such as for example spotlights for lighting, hooks, mirrors, pegs or coat racks of various shapes, curtain rod supports and supports for shelves intended for storing crockery, kitchen utensils or books.

The substrates to which an article may be fastened are very varied and comprise, in particular, plaster tiles (optionally coated or not with a layer of paint or with a covering of paper), ceramic tiles, concrete, asbestos cement, wood, compressed wood particle boards, optionally laminated with a synthetic coating, or else rigid panels made of plastics such as polyvinyl chloride or polymethyl methacrylate.

The amount of adhesive composition to be deposited varies depending on the size and the weight of the article to be fastened and may cover from 10 to 70% of the surface of the article to be bonded, preferably from 20 to 40%.

In the case of an article to be fastened to a substrate included in a vertical surface, the bead of adhesive composition is preferably placed on the upper half of the planar surface of the article intended to be in contact with the substrate, in the vicinity of the line of contact between said surface and the substrate.

The invention finally relates to a method for separating the article attached to a substrate in accordance with the method defined previously, comprising the implementation of an adhesive failure.

Unlike the cohesive failure described in patent application US 2006/0178470, an adhesive failure has the effect of detaching the article from the substrate at the interface of the adhesive joint of crosslinked adhesive with the article or the substrate. The possibility of obtaining such a failure, in accordance with this method and by virtue of the adhesive composition used, advantageously makes it possible to avoid the presence of crosslinked adhesive residues originating from the adhesive joint and remaining fastened to the surface of the article and/or of the substrate after their separation.

From a practical point of view, an adhesive failure enabling the article to be separated from the substrate may be initiated by introducing a fine metal blade having a thickness of at most around 1 mm into the interface between, on the one hand, the adhesive joint of crosslinked adhesive and, on the other hand, the article or the substrate. Depending on the size of the article, the failure thus initiated is continued by simple manual stresses on the article exerted by the individual perpendicular to the plane of the substrate. The initiation of the adhesive failure is made easier when, in accordance with one preferred embodiment of the adhesive composition according to the invention, this composition comprises, in addition, from 0.1 to 5% of rubber granulates of non-spherical shape having a size between 0.5 and 2 mm, preferably between 0.8 and 1.2 mm.

The initiation of the adhesive failure is further facilitated, for the preferred variant of the fastening method according to the invention, according to which the bead of adhesive composition is placed on the upper half of the planar surface of the article intended to be in contact with the substrate, in the vicinity of the line of contact between said surface and the substrate.

The following examples are given purely by way of illustration of the invention and should not be interpreted as limiting the scope thereof.

Example 1

Fixing Adhesive Comprising a Polyether Having an Alkoxysilane Terminal Radical

Use is made of a polyether having an alkoxysilane terminal radical (A1) obtained from Kaneka under the name MS® Polymer S303H, referred to below as silanized polyether (or PE).

The adhesive composition that appears in the table below is prepared by simple mixing of the ingredients indicated.

The peelability, the tensile strength and the shear strength of the adhesive composition thus obtained are evaluated, after crosslinking, by the following tests.

Adhesive Joint Peelability Test:

The principle of this test consists in obtaining an adhesive joint constituted of the crosslinked adhesive composition and fastened to a substrate, said joint having the shape of a parallelepiped having a length of 28 cm, a width of 2 cm and a thickness of 2 mm. This joint is fastened by adhesion to said substrate except for its two ends that are left free over a length of around 2 cm each, so that these ends can be easily lifted manually in order to carry out peeling along an angle of around 180°.

In order to do this, use is conveniently made of the following equipment:

a square grid 1 represented in FIG. 1, having sides of 30 cm, comprising 7 parallel recesses 2 having the shape and dimensions of the parallelepiped defined above;
a tile of a substrate having sides of 30 cm, made from a material which is either ceramic, or asbestos cement, or oak wood.

Deposited along two opposite sides of the substrate tile is an adhesive tape having a width of 3 cm. The square grid is then superposed onto the substrate tile, so that the 2 adhesive tapes are perpendicular to the recesses 2, then the grid is fastened to the substrate tile by means of another adhesive tape.

One or more recesses are then filled with the adhesive composition or compositions to be tested, removing the possible overflows with a spatula.

The assembly is left to rest for 7 days at ambient temperature and hygrometry so as to obtain a complete crosslinking of the adhesive composition under the action of atmospheric moisture.

The grid is then separated from the substrate: the joints of crosslinked adhesive composition adhere to the substrate tile, except over the 2 ends left free due to the protection of the substrate by the adhesive tape.

The manual peeling of the crosslinked joint test specimens is then carried out using their ends that have been left free.

The behaviour of the joint during peeling is evaluated visually by attributing a grade ranging from 1 to 4:

4=100% adhesive failure of the joint on the substrate, that is to say that the crosslinked joint may be separated as one single piece from the substrate without leaving any residue on the latter.

3=20% cohesive failure and 80% adhesive failure: the crosslinked joint can be separated as one or more pieces, the joint residues occupying around 20% of the surface of the rectangular strip of the substrate which was in contact with the joint.

2=80% cohesive failure and 20% adhesive failure: the crosslinked joint can be separated as one or more pieces, around 80% of the surface of the rectangular strip which was in contact with the joint being covered with residues.

1=100% cohesive failure: during peeling, the joint breaks and/or a residue of the joint is observed on the entire surface of the strip.

The grades obtained are indicated in the table below for the 3 substrates tested.

Tensile Strength Test of the Adhesive Joint (Standard NF ISO 37):

The tensile stress leading to the failure of the adhesive joint is measured.

The principle of this measurement consists in stretching, in a tensile machine, the mobile jaw of which moves at constant rate, a standard dumbbell-shaped test specimen constituted of the crosslinked adhesive composition and in recording the stress applied at the moment when the failure of the test specimen occurs.

The dumbbell used is in accordance with Type 1 from the Standard NF ISO 37.

The result is indicated in $kg/cm^2$ in the table below.

Shear Strength Test of the Adhesive Joint (Standard ISO 4587):

The shear stress leading to failure of the adhesive joint is measured.

The principle of this measurement consists in stressing, in a tensile machine, the mobile jaw of which moves at constant rate, a test specimen of standard shape constituted of the crosslinked adhesive composition between two rigid wooden supports, and in recording the stress applied at the moment when the failure of the test specimen occurs.

A result of around 15 $kg/cm^2$ is obtained.

Examples 2 to 6

Fixing Adhesive Comprising a Polyurethane Having an Alkoxysilane Terminal Radical (or Silanized PU)

Example 1 is repeated by preparing the compositions that appear in the table in which the polymer (A2) is a polyurethane having an alkoxysilane terminal radical, referred to as silanized PU.

The peelability grades and the tensile stress at failure, for the joints of corresponding crosslinked adhesive composition, are also indicated in the table.

Substantially the same result is obtained for the shear strength.

Example 7

Fixing Adhesive Comprising the Polyurethane Having an Alkoxysilane Terminal Radical F 1) Preparation of the polyurethane F of formula (II) in which:
   the polyether block of formula —$[OR^4]_n$— is such that $R^4$ is the isopropylene radical and has a molecular weight of around 8250 Da;
   the 2 terminal groups of alkoxysilane type are constituted by the trimethoxysilyl radical; and
   $R^5$ is the n-propylene radical.

Introduced into a glass reactor are:
- 961.2 g (0.1165 mol) of the poly(isopropoxy)diol ACCLAIM® 8200;
- 12.99 g (0.0582 mol) of isophorone diisocyanate (IPDI), which corresponds to a ratio of the numbers of NCO/OH functional groups equal to 0.5;
- 120 ppm of a catalyst of bismuth/zinc neodecanoate type (available commercially from Borchers, under the name Borchi Kat VP 0244).

This mixture is kept under constant stirring at 85° C. and under nitrogen for 3 hours, until the complete reaction of the NCO functional groups of the IPDI.

Added to the hydroxyl-terminated polyurethane thus obtained are then 24.6 g (0.1165 mol) of γ-isocyanato-n-propyltrimethoxysilane and the mixture is kept at 85° C. until the NCO functional groups have completely disappeared.

The polyurethane F obtained has a viscosity of 55 Pa·s (measured using a Brookfield viscometer at 23° C., with a spindle 7 rotating at a rate of 20 rpm), a molecular weight of around 20 kDa and a polymolecularity index of around 1.3.

2) Preparation of the Corresponding Fixing Adhesive:

Example 1 is repeated by preparing the composition that appears in the table in which the polymer (A2) is the silanized PU F.

The peelability grades and the tensile stress at failure, for the joints of corresponding crosslinked adhesive composition, are also indicated in the table.

Substantially the same result is obtained for the shear strength.

Example 8

Fixing Adhesive Comprising the Polyurethane Having an Alkoxysilane Terminal Radical F Example 7 is repeated with the content indicated for the silanized PU F.

The peelability and tensile strength results indicated in the table are obtained and substantially the same result for the shear strength is obtained.

Examples 9 and 10

Fixing Adhesive Comprising a Silanized PU and Rubber Granulates

One of the Examples 2 to 6 is repeated with the silanized PU content indicated in the table and also incorporating rubber granulates of non-spherical shape having a size between 0.8 and 1.2 mm, with a content of said granulates also indicated in the table.

The peelability and tensile strength results indicated in the table are obtained and substantially the same result is obtained for the shear strength.

The peelability of the adhesive compositions from Examples 1 to 10 reveals a behaviour characteristic of an adhesive failure.

| | | | | | Content in % | | | | | |
|---|---|---|---|---|---|---|---|---|---|---|
| Ingredient | Ex. 1 | Ex. 2 | Ex. 3 | Ex. 4 | Ex. 5 | Ex. 6 | Ex. 7 | Ex. 8 | Ex. 9 | Ex. 10 |
| (A1) Silanized PE | 70.5 | — | — | — | — | — | — | — | — | — |
| (A2) Silanized PU | — | 60.5 | 76.8 | 70.5 | 74.3 | 69.1 | — | — | 74.35 | 72.9 |
| (A2) Silanized PU F | — | — | — | — | — | — | 70.55 | 74.3 | — | — |
| (B) Pyrogenic silica | 16.3 | 16.3 | 10 | 16.3 | 17.2 | 17.2 | 16.3 | 17.2 | 16.3 | 16.8 |
| (C) DYNASYLAN® 6490 | 10.5 | 10.5 | 10.5 | 10.5 | 5.7 | 11.1 | 10.5 | 5.7 | 5.3 | 5.2 |
| (D) TEGOKAT® 223 | 0.4 | 0.4 | 0.4 | 0.4 | 0.4 | 0.4 | 0.4 | 0.4 | 0.4 | 0.4 |
| VTMO | 2.1 | 2.1 | 2.1 | 2.1 | 2.2 | 2.2 | 2.1 | 2.2 | 2.1 | 2.2 |
| Rubber granulates | — | — | — | — | — | — | — | — | 0.3 | 2.6 |
| Calcium carbonate | — | 10 | — | — | — | — | — | — | — | — |
| Peelability: Ceramic | 4 | 4 | 4 | 4 | 4 | 3 | 4 | 3 | 4 | 4 |
| Asbestos cement | 4 | 4 | 4 | 4 | 4 | 4 | 3 | 3 | 3 | 3 |
| Oak wood | 4 | 3 | 4 | 4 | 4 | 4 | 4 | 4 | 4 | 4 |
| Tensile stress at failure (kg/cm²) | 26 | 71 | 85 | 106 | 59 | 69 | 66 | 24 | 28 | 21 |

The invention claimed is:

1. An adhesive composition comprising:
   (i) from 58 to 80% by weight of a moisture-crosslinkable polymer (A) comprising at least:
   as main chain, a polyurethane (A2) having a number-average molecular weight between 600 Da and 60 kDa, being the condensation product of a polyether polyol and/or a polyester polyol with polyisocyanates, and
   an alkoxysilane terminal radical of formula (I), $$—Si(R^1)_p(OR^2)_{3-p} \quad (I)$$

in which:
   $R^1$ and $R^2$, which are identical or different, each represent a linear or branched alkyl radical having 1 to 4 carbon atoms, and when there are multiple $R^1$ radicals, the $R^1$ radicals may be identical or different, and when there are multiple $R^2$ radicals, the $R^2$ radicals may be identical or different;
   p is an integer equal to 0, 1 or 2;
   said alkoxysilane radicals being connected to the main chain directly by its available bond or indirectly (ii) from 8 to 20% by weight of a silica (B) having a BET specific surface area between 150 and 250 m²/g;

(iii) from 4 to 15% by weight of an oligomer of a vinyl derivative of an alkoxyalkylsilane (C) having a number-average molecular weight between 500 Da and 5 kDa, (iv) from 0.01 to 3% by weight of a crosslinking catalyst (D), and (v) from 0.1 to 5% by weight of rubber granulates of non-spherical shape having a size between 0.5 and 2 mm.

2. The adhesive composition according to claim 1, wherein the composition comprises from 60 to 77% of polymer (A), from 10 to 18% of pyrogenic silica (B), from 5 to 12% of oligomer (C) and from 0.1 to 2% of catalyst (D).

3. The adhesive composition according to claim 1, wherein the composition comprises, in addition, up to 3% of a hydrolysable alkoxysilane derivative, as a desiccant.

4. A method for fastening an article to a substrate included in the floors, vertical surfaces and/or ceilings of dwellings, comprising:
(a) depositing the adhesive composition as defined in claim 1 in the form of a bead having a diameter of 2 to 10 mm onto the surfaces of the article or of the substrate intended to be in contact;
(b) applying the article to the substrate by simple manual pressure; then
(c) crosslinking said adhesive composition under the effect of atmospheric moisture over a time between 1 hour and 48 hours.

5. The method according to claim 4, wherein the substrate is included in a vertical surface, and the bead of adhesive composition is deposited on the planar surface of the article intended to be brought into contact with the substrate.

6. The method according to claim 5, wherein the weight of the article to be fastened corresponds to a shear stress exerted on the joint constituted of the crosslinked adhesive composition, wherein the shear stress ranges from 3 to 20 kg/cm².

7. The method according to claim 4, wherein the article to be fastened can be used for the purposes of outfitting or decorating a dwelling.

8. The method according to claim 5, wherein the bead of adhesive composition is placed on the upper half of the planar surface of the article intended to be in contact with the substrate, in the vicinity of the line of contact between said surface and the substrate.

9. A method for separating the article attached to a substrate in accordance with the method defined in claim 4, comprising the implementation of an adhesive failure.

10. The adhesive composition according to claim 1, wherein the size of the non-spherical shape rubber granulates is between 0.8 and 1.2 mm.

11. The method according to claim 4, wherein the substrate is part of a floor, vertical surface or ceiling of a dwelling.

12. The method according to claim 4, wherein the bead has a diameter from 4 to 10 mm.

13. The method according to claim 4, wherein the crosslinking is over a time between 4 hours and 24 hours.

14. The adhesive composition according to claim 1, wherein the oligomer is obtained by oligomerization of a vinyl derivative of an alkoxyalkylsilane.

15. The adhesive composition according to claim 1, wherein the polymer (A) has the formula (II):

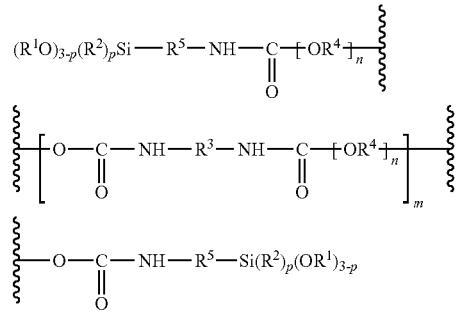

in which:
R¹ and R², which are identical or different, each represent a linear or branched alkyl radical having 1 to 4 carbon atoms, and when there are multiple R¹ radicals, the R¹ radicals may be identical or different, and when there are multiple R² radicals, the R² radicals may be identical or different;

R³ represents a hydrocarbon divalent radical comprising from 5 to 15 carbon atoms which may be aromatic or aliphatic, linear, branched or cyclic;

R⁴ represents a linear or branched alkylene divalent radical comprising from 1 to 4 carbon atoms;

R⁵ represents a linear alkylene divalent radical comprising from 1 to 3 carbon atoms;

n is an integer such that the number-average molecular weight of the polyether block of formula [OR⁴]ₙ— is between 300 Da and 30 kDa;

m is an integer such that the number-average molecular weight of the polymer of formula (II) is between 600 Da and 60 kDa; and p is an integer equal to 0, 1 or 2.

* * * * *